(12) United States Patent
Nagase et al.

(10) Patent No.: US 10,611,309 B1
(45) Date of Patent: Apr. 7, 2020

(54) TAILGATE INTERLOCKING OCCUPANT STEP

(71) Applicant: AISIN TECHNICAL CENTER OF AMERICA, INC., Northville, MI (US)

(72) Inventors: Koji Nagase, Novi, MI (US); Daisuke Yamada, Ann Arbor, MI (US)

(73) Assignee: AISIN TECHNICAL CENTER AMERICA, INC., Northville, MI (US)

( * ) Notice: Subject to any disclaimer, the term of this patent is extended or adjusted under 35 U.S.C. 154(b) by 0 days.

(21) Appl. No.: 16/259,526

(22) Filed: Jan. 28, 2019

(51) Int. Cl.
| | |
|---|---|
| *B60R 3/02* | (2006.01) |
| *B62D 33/027* | (2006.01) |
| *B62D 33/03* | (2006.01) |
| *E05F 15/603* | (2015.01) |
| *E05F 15/77* | (2015.01) |

(52) U.S. Cl.
CPC ............ *B60R 3/02* (2013.01); *B62D 33/0273* (2013.01); *B62D 33/03* (2013.01); *E05F 15/603* (2015.01); *E05F 15/77* (2015.01); *E05Y 2400/85* (2013.01); *E05Y 2900/546* (2013.01)

(58) Field of Classification Search
CPC ...... E05V 2900/546; B60R 3/02; B62D 33/03
See application file for complete search history.

(56) References Cited

U.S. PATENT DOCUMENTS

| | | | | |
|---|---|---|---|---|
| 7,163,221 | B2* | 1/2007 | Leitner | B60R 3/02 |
| | | | | 105/444 |
| 9,272,667 | B2* | 3/2016 | Smith | B60R 3/02 |
| 9,539,948 | B1* | 1/2017 | Presley | B60R 3/02 |
| 9,963,076 | B1* | 5/2018 | Bender | B62D 33/03 |
| 2016/0160553 | A1* | 6/2016 | Nania | E05F 15/627 |
| | | | | 296/50 |
| 2017/0298675 | A1* | 10/2017 | Dimig | B60R 3/02 |

FOREIGN PATENT DOCUMENTS

JP        2014-34273 A    2/2014

* cited by examiner

*Primary Examiner* — John D Walters
*Assistant Examiner* — James J Triggs
(74) *Attorney, Agent, or Firm* — Oblon, McClelland, Maier & Neustadt, L.L.P.

(57) ABSTRACT

A tailgate interlocking occupant step apparatus and method for a vehicle, includes a powered tailgate, a powered occupant step, a kick sensor mounted to the occupant step, and a controller having processing circuitry. The processing circuitry detects a signal from the kick sensor, operates the powered occupant step to move the occupant step to an extended position, operates the powered tailgate to lower the tailgate to an opened position, and when a pinch force is detected either in the occupant step or the tailgate, stops the operation of both the occupant step and the tailgate.

18 Claims, 4 Drawing Sheets

TAILGATE INTERLOCKING OCCUPANT STEP

BACKGROUND OF THE INVENTION

Field of the Invention

The present disclosure relates generally to interlocking operation of a vehicle tailgate and an occupant step, and particularly a controller that controls interdependent operation of the vehicle tailgate and the occupant step.

Description of the Related Art

Vehicles having a truck bed, such as a pickup truck or similar vehicles may be provided with a bed step (herein also referred to as an occupant step). The occupant step is a step that can be used to easily get on and off a tailgate of the vehicle in order to load and unload items in the truck bed. Both the occupant step and the tailgate may be driven by motors. Each of the motors may be controlled by electronic control units (ECU's). One motor extends the occupant step. The other motor opens the tailgate. Each motor may perform an inverse operation of retracting the occupant step and closing the tailgate, respectively. In some cases, a vehicle may be equipped with two occupant steps, one in the vicinity of each corner in the rear of the vehicle.

To operate the motor driven occupant step and motor driven tailgate, a person will approach the rear of the vehicle and may grip a handle on the tailgate. The person will press or lift the handle to release the tailgate latch. Releasing the tailgate latch causes the motor driven occupant step to extend. The releasing of the tailgate latch will also cause the tailgate to open. The person may then step on the occupant step up to the tailgate and enter the truck bed. However, the motor operated occupant step and the motor operated tailgate are independently controlled by respective ECU's.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY OF THE INVENTION

The present disclosure relates to a tailgate interlocking occupant step for a vehicle having a truck bed. A tailgate interlocking occupant step apparatus and method for a vehicle, includes a powered tailgate, a powered occupant step, a kick sensor mounted to the occupant step, and a controller having processing circuitry. The processing circuitry detects a signal from the kick sensor, operates the powered occupant step to move the occupant step to an extended position, operates the powered tailgate to lower the tailgate to an opened position, and when a pinch force is detected either in the occupant step or the tailgate, stops the operation of both the occupant step and the tailgate.

The foregoing paragraph has been provided by way of general introduction, and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
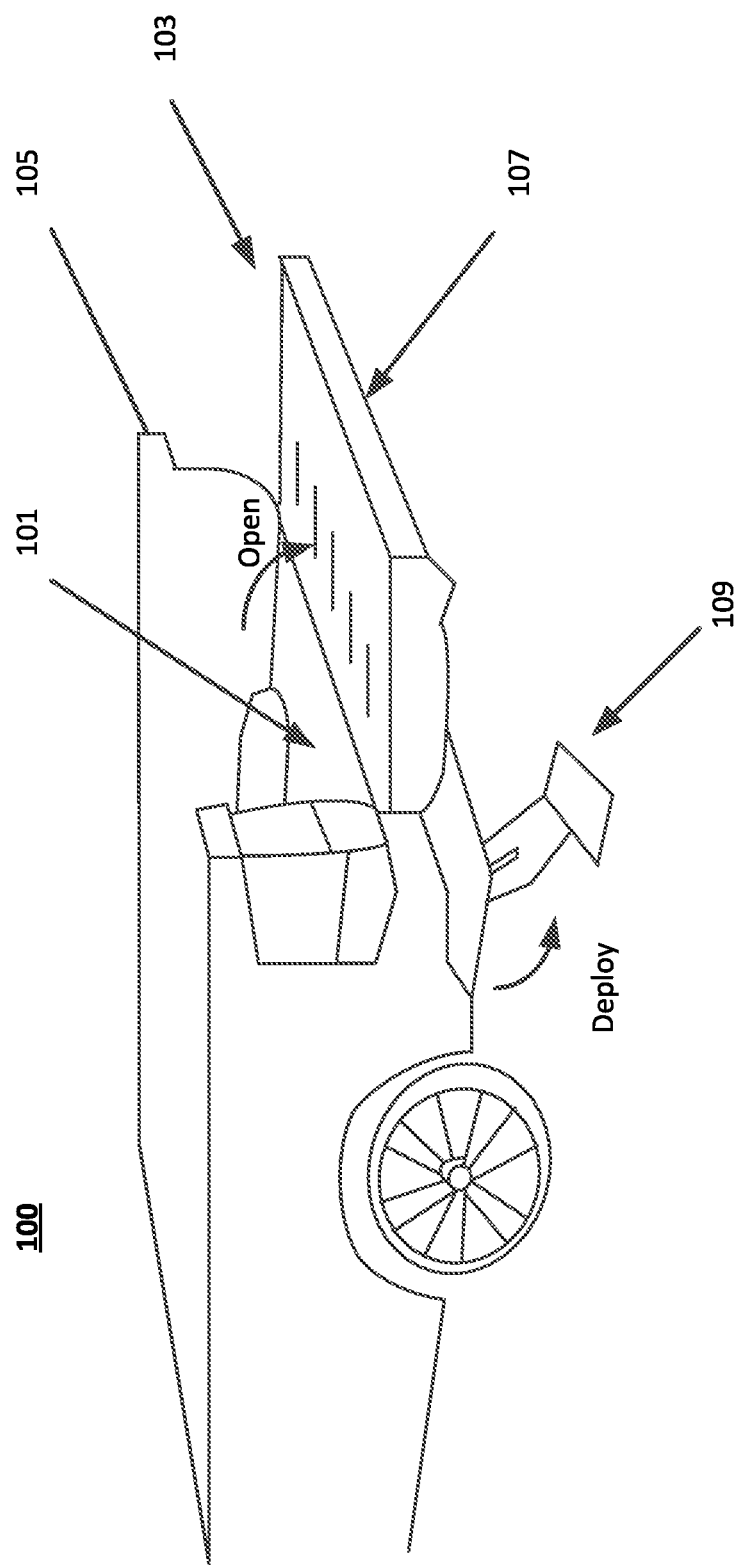
FIG. 1 illustrates a vehicle having a tailgate and occupant step to allow a person to step into a truck bed.

Referring now to the drawings, wherein like reference numerals designate identical or corresponding parts throughout several views, the following description relates to a tailgate interlocking occupant step assembly for a vehicle. Vehicles may include powered occupant steps and powered tailgates that are independently controlled and operated. FIG. 1 illustrates a vehicle having a tailgate and an occupant step. One mode of operation of the vehicle 100 has been for a person to grip the tailgate handle 107, causing the tailgate latch 105 to be released. Upon release of the tailgate latch 105, a powered occupant step 109 is deployed, and then a dampened tailgate 103 opens. In a case that a person is hit by the occupant step 109 when it is being operated to extend and a pinch is detected, the operation of the occupant step 109 may be stopped by its respective electronic control unit (ECU). A pinch may be detected, for example, when a motor or other operating device for the occupant step receives a force in the opposite direction of operation movement that causes the rotation speed to change or an increase in load is detected that greater than a predetermined threshold. However, the tailgate 103 may continue an opening operation. Also, external switches may be necessary to confirm that the tailgate 103 is in an opened state or a closed state. Disclosed are embodiments that provide a solution to these problems.

Figure 2:
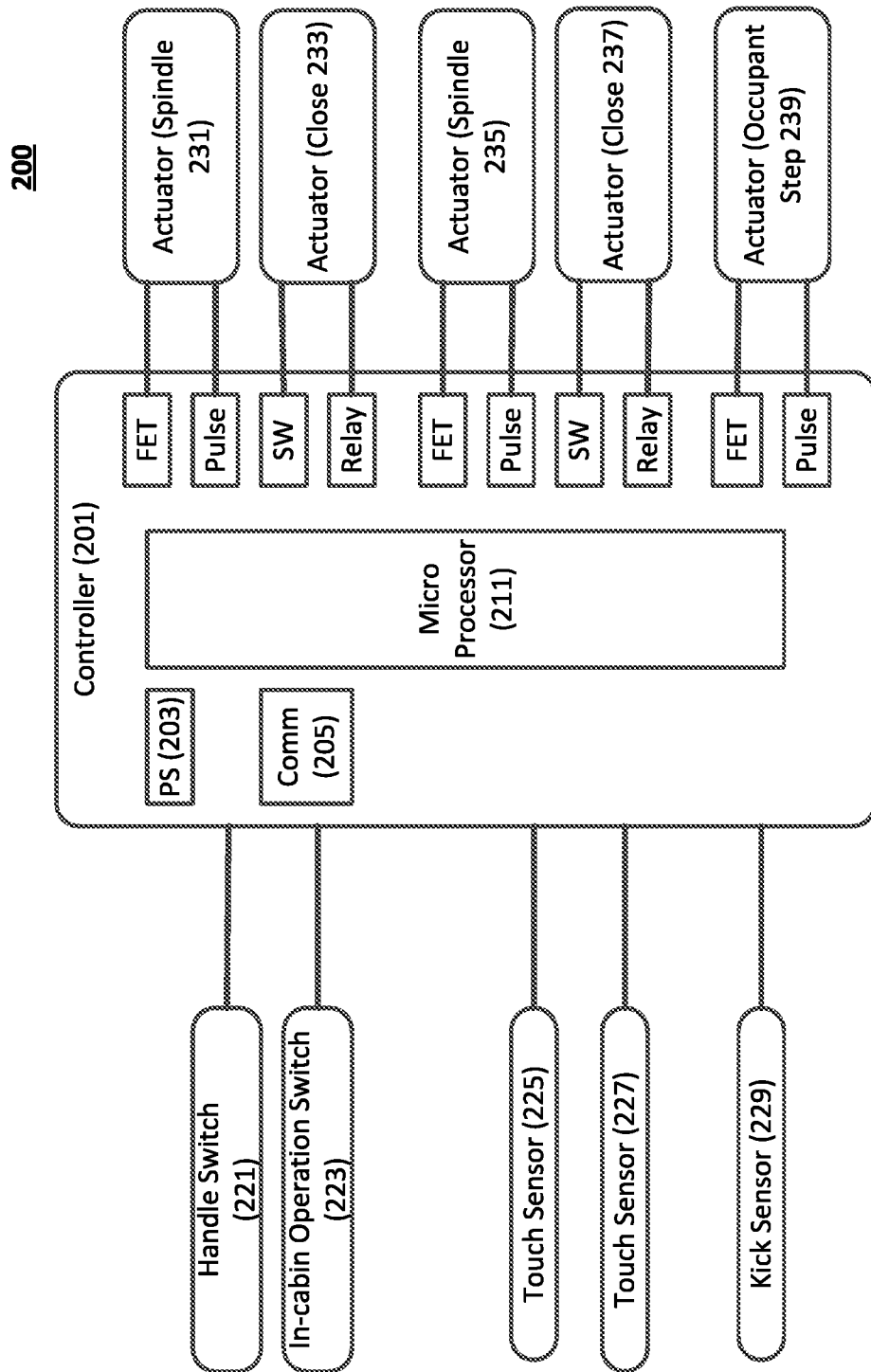
FIG. 2 is a block diagram of a control system in accordance with an exemplary aspect of the disclosure.

FIG. 2 is a block diagram of a control system in accordance with an exemplary aspect of the disclosure. The drawing is for purposes of explaining a basic controller and is non-limiting. The control system 200 may include a controller 201 having a micro-processor 211 implemented as processing circuitry. The controller 201 may include a power supply 203 and a communications circuit 205 for interfacing with other controllers in the vehicle and/or other external control devices. The controller 201 may include one or more digital and/or analog interfaces for sensors, providing input signals to the controller 201. The controller 201 may include specialized circuits and relays providing output control signals for control of actuators.

The micro-processor 211 may be an integrated circuit board having a processing chip, memory modules and I/O interfaces. The micro-processor 211 may include a security chip and other specialized processing devices such as a math co-processor. Memory modules may include Read Only Memory (ROM), Random Access Memory (RAM) and variants of non-volatile and volatile memory. In the case of a security chip, the security chip may have a dedicated secure memory. Any or all of the processors may include one or more processor cores.

Types of sensors may include a handle switch 221, an in-cabin operation switch 223, touch sensors 225, 227, and a kick sensor 229. The control system 200 is not limited to the sensors depicted in the drawing. For example, there may be several handle switches 221 and in-cabin operation switches 223 depending on the arrangement of the vehicle. The number and arrangement of touch sensors 225, 227 is dependent on the size and configuration of a touch surface or various touch surfaces on the vehicle. There may be several different kick sensors, each of different type and arrangement, or similar sensors at different locations. In addition, the controller 201 may receive signals from other types of sensors depending on the configuration of the particular vehicle.

Types of actuators may include actuators for small motors that can perform operations such as open and close doors or lift gates. An actuator for a motor may rotate a spindle. An aspect is an actuator that rotates a spindle 231 that moves a door or tailgate to an opened position. The actuator 231 may be controlled to stop operation of opening the door or tailgate at a position that is between fully closed or fully opened upon detection of an opposing force. In some embodiments an opposing force may be determined by detection of a predetermined torque on the respective motor spindle. The opposing force may be encountered when the door or tailgate comes into contact with a person or some other object and the person or other object is either not movable, or pushes back against the door or tailgate. There may be any number of actuators, e.g., 233, 235, 237, depending on the arrangement of doors and tailgate for a particular vehicle.

The control system 200 may include one or more actuators 239 for powered occupant steps. The actuators for the powered occupant steps may be controlled to stop operation at an intermediate position when an opposing force is detected. An opposing force may be encountered when an occupant step comes into contact with an obstacle. Powered occupant steps may be motor operated occupant steps or be powered by some other device such as a hydraulic system.

Figures 3A, 3B:
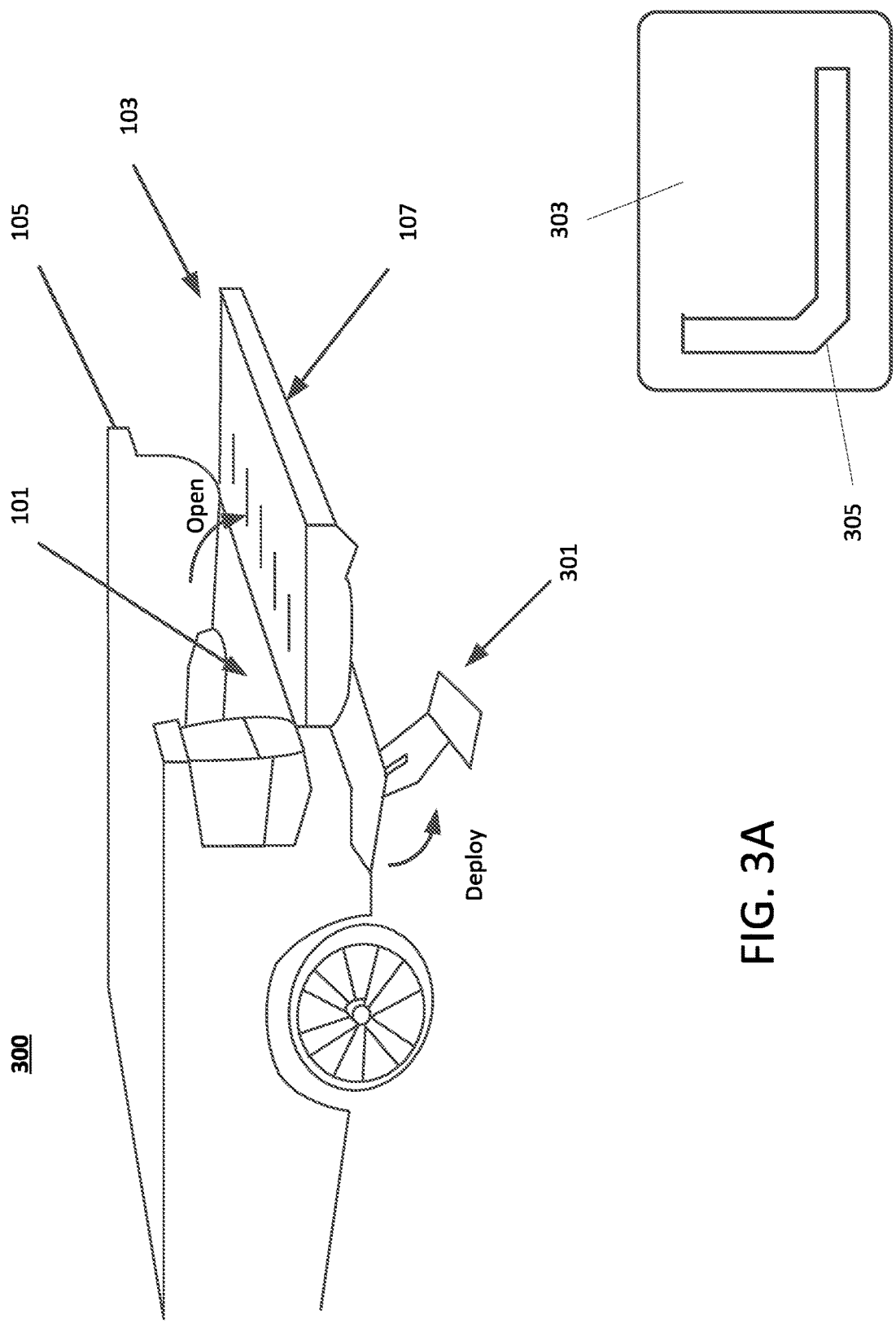
FIGS. 3A, 3B illustrates a vehicle having a tailgate and occupant step in accordance with an exemplary aspect of the disclosure.

FIGS. 3A and 3B illustrate a vehicle having a tailgate and occupant step in accordance with an exemplary aspect of the disclosure. In addition to a bed 101, tailgate 103, door handle 107 (underneath the tailgate when the tailgate is in the fully opened position), and tailgate latch 105, the vehicle 300 includes a powered occupant step 301. The occupant step 301 may be operated by detection of a kick sensor 305. The kick sensor 305 is a sensor that indicates that another object is proximate to the sensor. An example of a kick sensor 305 may be a capacitive proximity sensor having a plate through which current flows as an object comes within a certain distance of the sensor. The plate may be of such a shape that it will detect a person's foot moving to within a certain distance of the plate. In some embodiments, the plate is substantially L-shaped formed along the corner of the occupant step that faces the corner of the vehicle where the occupant step is mounted. The plate may also be C-shaped or rectangular shaped depending on such factors as the size of the occupant step, or the height of the underside of the vehicle from the ground. The plate may be made of a conductive metal that will maintain conduciveness over time, such as stainless steel. In some embodiments, the capacitive sensor detects an approaching object by a change in capacitance to a predetermined capacitance threshold.

Figure 4:
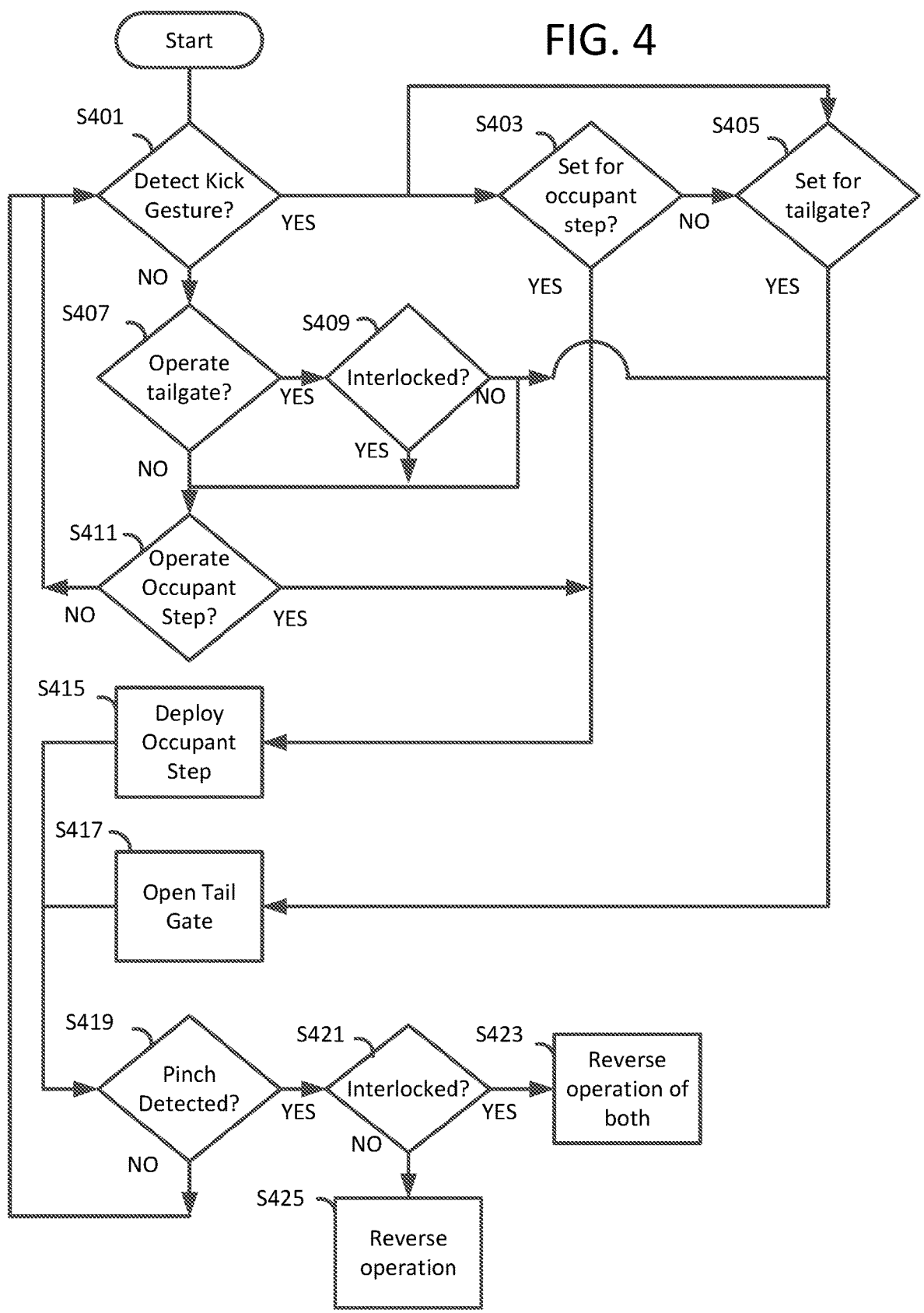
FIG. 4 is a flowchart for operation of the control system of FIG. 2.

FIG. 4 is a flowchart for operation of the control system of FIG. 2. The flowchart assumes a starting state in which the vehicle tailgate 103 is in a closed position and an occupant step 301 is in a retracted state. The flowchart also assumes that the kick sensor 305 is configured to detect a kick gesture performed by a person. In S301, upon detection of a kick gesture (YES in S401), the controller 201 checks settings for the occupant step 301 and tailgate 103. In some embodiments, the controller 201 may be set through a user interface, such as a touchscreen, to operate one of the occupant step 301 and the tailgate 103, or both when a kick gesture is detected by the kick sensor 305. In S403, the controller 201 checks whether the occupant step 301 is set. Even if the occupant step is not set (NO in S403), in S405, the controller 201 will also check whether the tailgate 103 is set. In S417, the tailgate may be operated based on the detection of the kick gesture. Otherwise, both the occupant step and the tailgate may be set to operate in an interlocked manner, in which case in S415 the controller 201 sends a signal to an actuator 239 to deploy the occupant step 301. Also, in S417, the controller 201 sends a signal to an actuator 231 to open the tailgate 103. When both the occupant step 301 and the tailgate 103 are set to operate in an interlocked manner, the controller 201 may instruct operation of both the occupant step 301 and the tailgate 103 substantially simultaneously. In some embodiments, the controller 201 may be configured to set a setting that prevents either the occupant step motor or the tailgate motor from being operated, or that prevents both the occupant step motor and the tailgate motor from operating.

In some embodiments, the tailgate 103 and the occupant step 301 may be operated using alternative forms of interaction. For example, the vehicle may be equipped with a button, switch, or touchscreen interface 225, 227 that may be used to engage operation of the tailgate 103, occupant step 301 or both. Also, the tailgate may be operated by lifting a handle 107 that activates a handle switch 221 and a latch 105. There may be situations where the person intends to open the tailgate 103 without also extending the occupant step 301. As such, when the controller 201 does not detect a kick gesture (NO in S401), the controller 201 may still receive a signal, via handle switch 221, indicating that the handle 107 has been manipulated to cause the tailgate latch 105 to disengage the tailgate. In S407, upon receiving a signal from the handle switch 221 (YES in S407), the controller 201, in S409 may check if the occupant step 301 and the tailgate 103 are set to an interlocked state. If the tailgate 103 is not set to be linked (NO in S409), the receiving of the signal from the handle switch 221 will trigger the controller 201 to, in S417, control an actuator 231 to lower the tailgate. When the tailgate 103 and the occupant link 301 are set to be interlocked (YES in S409), in S411, the controller 201 will check that the occupant step is set to be operated. When the occupant step 301 is set to be operated (YES in S411), in S415 the occupant step 301 will be operated in interlocked fashion with the lowering of the tailgate.

A vehicle may be equipped with a power back door (PBD) or a power side door (PSD). In some embodiments, instead of interlocking the occupant step 301 with a tailgate 103, the occupant step 301 may be interlocked with a power back door. In some embodiments, the occupant step 301 may be interlocked with a power side door. In this embodiment, the kick sensor may be incorporated into the occupant step and used to operate the occupant step and power back door in an interlocking or non-interlocking fashion. In some embodiments, the occupant step may be a side rail that extends out interlocked with opening of a power side door. In this embodiment, the kick sensor may be incorporated on the side rail and used to operate the side rail and the power side door in interlocking or non-interlocking fashion.

In some embodiments, the controller 201 may detect a pinch in either the occupant step 301 or the tailgate 103, or both, while the occupant step 301 is being deployed or while the tailgate 103 is opening. As mentioned above, a pinch may be detected when the spindle for the occupant step receives a force in the opposite direction of operation movement that is greater than a predetermined force threshold. In S419, when a pinch is detected (YES in S419), the controller 201 determines whether the occupant step 301 and tailgate 103 are interlocked. In some embodiments, when the controller 201 detects a pinch in either the occupant step 301 or the tailgate 103, the controller 201 may activate a warning buzzer. The warning buzzer may be one or more indicator lights, for example a blinking LED light, or may be a sound, such as a beeping sound, or may be both indicator lights and sound. The warning buzzer may inform an occupant that is being pinched that the occupant step 301 or tailgate 103, or both is being stopped due to pinching that exceeds a predetermined force. In some embodiments, the action of stopping an operation may allow for resuming operation if the pinching force is discontinued within a predetermined period of time. For example, if upon activating a warning buzzer, an occupant moves clear of the occupant step 301 and/or tailgate 103 that is undergoing a pinch force within a few seconds, the operation may be resumed as though no pinch had been detected.

In some embodiments, when the controller 201 detects a pinch in either the occupant step 301 or the tailgate 103, the controller 201 may activate a hazard lamp. The hazard lamp may be an existing hazard lamp on the exterior of a vehicle. For example, a hazard lamp may be the same hazard lamp that is activated by pressing a hazard button on the dash of a vehicle. In a similar fashion, the hazard lamp may be accomplished by a controlling a flashing pattern on all turning lights. The hazard lamp may be used to inform an occupant that is being pinched that the occupant step 301 or tailgate 103, or both is being stopped due to pinching that exceeds a predetermined force.

In S423, when the controller 201 determines that the occupant step 301 and tailgate 103 are interlocked (YES in S421), the controller 201 will stop operation of both the occupant step 301 and the tailgate 103 substantially simultaneously. In some embodiments, the controller 201 may then operate both the occupant step 301 and the tailgate 103 to move in a reverse direction, in which case the occupant step 301 is moved to a retracted position and the tailgate 103 is moved to a closed position. Also, in some embodiments, if a pinch is detected while the occupant step 301 is being moved to a retracted position or while the tailgate 103 is being moved to a closed position, operation of both the occupant step 301 and the tailgate 103 is stopped. When the controller 201 determines that the occupant step 301 and the tailgate 103 are not interlocked, operation of one of the occupant step 301 and the tailgate 103 is stopped depending on which one the pinch is detected. Also, operation of at least one of the occupant step 301 and the tailgate 103 may be reversed after being stopped.

In some embodiments, the controller 201 is configured to monitor the state of the occupant step 301 and tailgate 103 based on signals sent to or received from a respective actuator 231, 233, 235, 237, and 239.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof.

Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A tailgate interlocking occupant step apparatus for a vehicle, comprising:
   a powered tailgate;
   a powered occupant step;
   a kick sensor mounted to the occupant step; and
   a controller having processing circuitry configured to:
   detect a signal from the kick sensor,
   operate the powered occupant step to move the occupant step to an extended position,
   operate the powered tailgate to lower the tailgate to an opened position, and
   when a pinch force is detected either in the occupant step or the tailgate, stop the operation of at least one of the occupant step and the tailgate or operate at least one of the occupant step and the tailgate in reverse.

2. The apparatus of claim 1, wherein the processing circuitry is common processing circuitry for operating both the powered occupant step and the powered tailgate.

3. The apparatus of claim 1, wherein the kick sensor is a capacitive sensor that detects an approaching object by a change in capacitance to a predetermined capacitance threshold.

4. The apparatus of claim 2, wherein when the signal from the kick sensor is detected, the common processing circuitry operates the occupant step and the tailgate substantially simultaneously.

5. The apparatus of claim 2, wherein when the pinch force is detected in the occupant step, the common processing circuitry operates the tailgate to move in reverse.

6. The apparatus of claim 1, further comprising at least one of a warning buzzer and a hazard lamp,
   wherein when the pinch is detected, the processing circuitry activates at least one of the warning buzzer and the hazard lamp.

7. The apparatus of claim 2, wherein when the pinch force is detected in the occupant step, the common processing circuitry operates both the tailgate and the occupant step in reverse substantially simultaneously.

8. The apparatus of claim 1, wherein the powered occupant step includes a spindle attached to a respective occupant step motor.

9. The apparatus of claim 8, wherein the pinch force is detected when the motor for the occupant step receives a force in the opposite direction of operation movement that causes a decrease in motor speed or an increase in load that is greater than a predetermined threshold.

10. The apparatus of claim 1, wherein the controller is configured to set a setting that prevents the powered occupant step from being operated.

11. The apparatus of claim 1, wherein the controller is configured to set a setting that prevents both the powered occupant step and the powered tailgate from operating.

12. The apparatus of claim 2, further comprising a tailgate handle,
   wherein the common processing circuitry of the controller is further configured to:
   detect a signal indicating operation of the tailgate handle,
   operate the powered occupant step to move the occupant step to an extended position, operate the powered tailgate to lower the tailgate to an opened position, and when a pinch force is detected either in the occupant step or the tailgate, stop operation of at least one of the occupant step and the tailgate or operate at least one of the occupant step and the tailgate in reverse.

13. A method for a tailgate interlocking occupant step of a vehicle including a powered tailgate, a powered occupant step, a kick sensor mounted to the occupant step, and a controller having common processing circuitry for operating both the powered tailgate and the powered occupant step, the method comprising:

detecting, by the common processing circuitry, a signal from the kick sensor, operating, by the common processing circuitry, the powered occupant step to move to an extended position, operating, by the common processing circuitry, the powered tailgate to lower to an opened position, and when a pinch force is detected either in the occupant step or the tailgate, stopping, by the common processing circuitry, the operation of at least one of the occupant step and the tailgate or operate at least one of the occupant step and the tailgate in reverse.

14. The method of claim 13, wherein when the signal from the kick sensor is detected, operating, by the common processing circuitry, the occupant step and tailgate substantially simultaneously.

15. The method of claim 13, wherein when the pinch force is detected in the occupant step, operating, by the common processing circuitry, the tailgate to move in reverse.

16. The method of claim 13, wherein when the pinch force is detected, activating, by the processing circuitry, a warning buzzer and a hazard lamp.

17. The method of claim 13, wherein when the pinch force is detected in the occupant step, operating, by the common processing circuitry, both the tailgate and the occupant step in reverse substantially simultaneously.

18. The method of claim 13, the vehicle further comprising a tailgate handle, the method further comprising:

detecting, by the common processing circuitry, a signal indicating operation of the tailgate handle, operating, by the common processing circuitry, the powered occupant step to move to an extended position, operating, by the common processing circuitry, the powered tailgate to lower to an opened position, and when a pinch force is detected either in the occupant step or the tailgate, stopping, by the common processing circuitry, operation of at least one of the occupant step and the tailgate or operate at least one of the occupant step and the tailgate in reverse.

* * * * *